W. F. HOSFORD.
APPARATUS FOR BRAZING THIN METAL PARTS.
APPLICATION FILED MAR. 19, 1920.
1,435,470.
Patented Nov. 14, 1922.
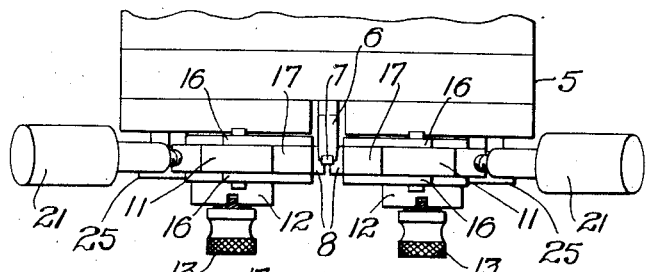
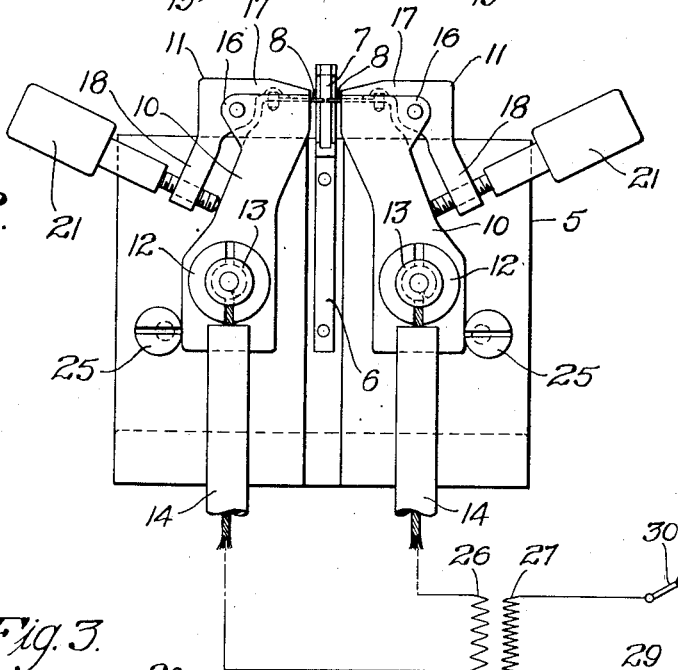
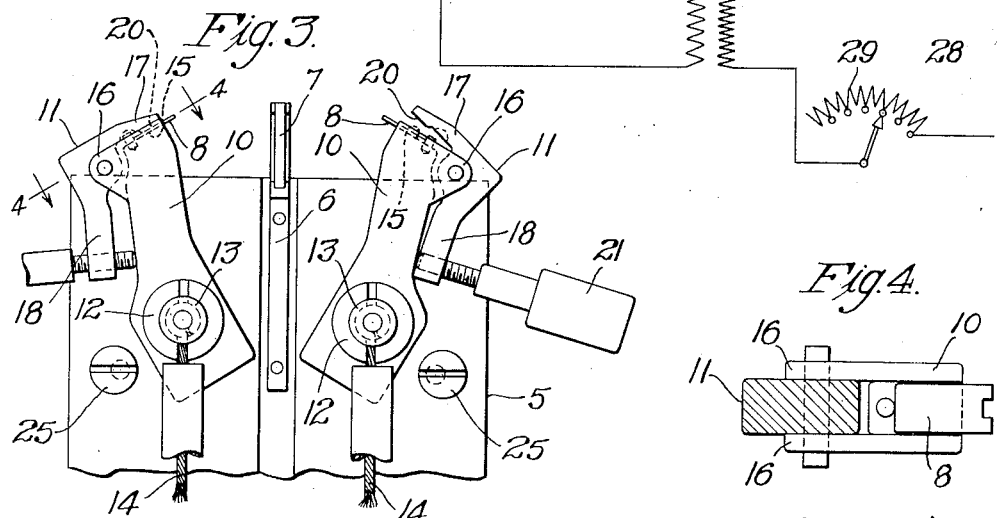
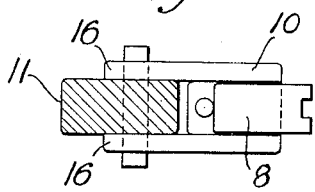
Inventor
William F. Hosford
by G. M. Campbell
Atty.

Patented Nov. 14, 1922.

1,435,470

UNITED STATES PATENT OFFICE.

WILLIAM F. HOSFORD, OF OAK PARK, ILLINOIS, ASSIGNOR TO WESTERN ELECTRIC COMPANY, INCORPORATED, OF NEW YORK, N. Y., A CORPORATION OF NEW YORK.

APPARATUS FOR BRAZING THIN METAL PARTS.

Application filed March 19, 1920. Serial No. 367,071.

*To all whom it may concern:*

Be it known that I, WILLIAM F. HOSFORD, a citizen of the United States, residing at Oak Park, in the county of Cook and State of Illinois, have invented certain new and useful Improvements in an Apparatus for Brazing Thin Metal Parts, of which the following is a full, clear, concise, and exact description.

This invention relates to a method of and an apparatus for brazing thin metal parts.

The invention has for one of its objects the brazing of thin metal parts without softening or reducing the stiffness thereof.

In the practice of the invention the parts to be brazed are firmly held and a brazing heat is localized in the portion thereof in which the braze is to take place. The heat is preferably applied by means of an electric current and the parts to be brazed are made conductors in the circuit of the current.

Another object of this invention is to provide a simple and compact form of apparatus for practicing this method of brazing. A preferred form of device for this purpose is one in which pivotal electrodes constitute clamping means for holding parts to be brazed and are adapted to contact with all of the surface of the thin metal part except that which is to receive the brazing heat.

In the drawings illustrating this invention:

Fig. 1 is an end view of the apparatus in an inverted position;

Fig. 2 is a plan view of the device with the electrodes in brazing position and showing also the circuit over which the current is supplied;

Fig. 3 is a fragmentary plan view of the device with the electrodes in different positions, and Fig. 4 is an enlarged detail sectional view of one of the clamps taken on line 4—4 of Fig 3.

As shown in the drawings, 5 designates a main supporting block upon which is mounted a bracket member 6 for supporting a block or piece of material 7 to which thin metal strips 8, 8 are to be secured by brazing.

Pivotally mounted upon the main supporting block 5 are a pair of work holding devices each comprising a main supporting member 10 and an adjustable clamping member 11. Each of the main supporting members 10 is pivotally supported upon the block 5 by pivotal supporting means 12 which is also adapted to receive a clamping nut 13 for securing a conductor 14 thereto. At its upper end each of the supporting members 10 is slightly recessed as shown at 15 and is provided with a pair of rearwardly extending ears 16, 16. Supported between the ears 16, 16 of each of the supporting members 10 is the adjustable clamping member 11 which comprises angularly disposed arms 17, 18. The arm 17 is adapted to fit between the side of the recessed portion 15 in the supporting member 10 and engage the thin metal strip 8 therein. In order to provide sufficient pressure on the strip 8 to insure good contact throughout the major portion of the member 10 the arm 17 is provided with a projecting surface 20 which engages the top surface of the thin metal strip 8 to press it firmly against the engaging surface of the member 10 to thereby provide a large conducting surface in contact with all of that portion of the strip 8 which is not to be subjected to the brazing heat. The arm 18 of the clamping member 11 is adapted to receive a screw threaded clamping stud 21, the inner end of which bears against the outer edge of the supporting member 10 so that the turning of the stud 21 will move the end 17 of clamp 11 toward or away from the supporting member 10 to permit the ready insertion and removal of the strip 8 and to clamp it firmly in place during the brazing operation.

At their lower ends the supporting members 10, 10 bear against eccentric screws 25, 25 which may be adjusted to limit the forward movement of said supporting members 10, 10.

The conductors 14, 14 are connected with a transformer secondary 26 the primary 27 of which is included in an energizing circuit 28 with a rheostat 29 and a switch 30.

In the operation of this invention a block 7 is placed upon the bracket 6 and a thin metal strip is placed in each of the supporting members 10, 10. The studs 21, 21 are screwed down firmly against the supporting members 10, 10 thereby tightening the clamps 11, 11 upon the strips 8, 8. The supporting members 10, 10 are then swung inwardly to bring the projecting ends of the thin metal strips 8, 8 into engagement with the block 7. This is followed by the application of the brazing compound and the closure of the switch 30 for a very short period of time. The rheostat 29 is so adjusted that sufficient current will be caused to flow upon closure of the switch 30 to cause a union of the parts to be brazed, and due to the large area of conducting surface in contact with the major portions of each of the strips 8, 8, only that part of the strips extending beyond the supporting members 10, 10 will receive sufficient heat to become annealed.

What is claimed is:

1. In an apparatus for brazing thin metal parts, a main supporting plate, a pair of oppositely disposed clamping members pivotally mounted on said supporting plate for holding the thin metal parts in a brazing position, and means for applying heat through said clamping means to braze the parts.

2. In an apparatus for brazing thin metal parts, a main supporting plate, a pair of adjustable arms, clamping means carried by said arms for holding the thin metal parts in brazing position and completing a circuit therethrough, and electrical connections to said arms through which electrical current is applied to braze said parts.

3. In an apparatus for brazing thin metal parts, a main supporting plate, a pair of pivotally mounted supporting arms carried by said plate, a pivotally mounted clamping and contact lever carried by each of said arms, means for securely clamping said lever onto parts to be brazed, and electrical connections to said supporting arm for carrying a heat generating current therethrough.

4. In an apparatus for brazing thin metal parts, pivotally mounted supporting arms each provided with a recessed portion adapted to receive a part to be brazed, a clamping lever carried by each of said arms, a screw-threaded stud passing through each of said levers and engaging the face of the corresponding supporting arm to tighten said clamp in place, and an electrical connection to said arms through which a current may be passed through the parts to be brazed.

5. In an apparatus for brazing thin metal parts to a supporting member, a main supporting plate, a bracket for holding the supporting part, a pair of supporting conducting arms pivotally mounted upon the main supporting plate and adapted to swing toward said bracket in the brazing position, clamping means on each of said arms for supporting a thin metal strip to be brazed to the supporting part, electrical connections to said supporting arms, and adjustable stop means for regulating the swinging movement of said supporting arms.

6. In an apparatus for brazing thin metal parts, a pair of adjustable conducting arms adapted to engage the parts to be brazed over all of the surfaces thereof except that to be subjected to the brazing heat, a support for said arms, and current connections for said arms.

In witness whereof, I hereunto subscribe my name this 3rd day of March A. D., 1920.

WILLIAM F. HOSFORD.